(12) United States Patent
Dürbaum et al.

(10) Patent No.: US 7,839,132 B2
(45) Date of Patent: Nov. 23, 2010

(54) POWER CONVERTER

(75) Inventors: Thomas Dürbaum, Langerwehe (DE); Reinhold Elferich, Aachen (DE); Tobias G. Tolle, Aachen (DE); Jeffery Olsen, Banks, CA (US)

(73) Assignee: NXP B.V., Eindhoven (NL)

( * ) Notice: Subject to any disclaimer, the term of this patent is extended or adjusted under 35 U.S.C. 154(b) by 1143 days.

(21) Appl. No.: 10/534,480

(22) PCT Filed: Nov. 5, 2003

(86) PCT No.: PCT/IB03/04970

§ 371 (c)(1),
(2), (4) Date: May 10, 2005

(87) PCT Pub. No.: WO2004/047277

PCT Pub. Date: Jun. 3, 2004

(65) Prior Publication Data

US 2006/0091867 A1    May 4, 2006

(30) Foreign Application Priority Data

Nov. 15, 2002    (EP) .................... 02102594

(51) Int. Cl.
*G05F 1/00* (2006.01)
(52) U.S. Cl. .................. 323/290; 323/284
(58) Field of Classification Search ............. 323/290, 323/282, 284, 288, 223, 266, 344
See application file for complete search history.

(56) References Cited

U.S. PATENT DOCUMENTS

| | | | |
|---|---|---|---|
| 4,301,801 A * | 11/1981 | Schneiderman | 606/38 |
| 4,964,029 A * | 10/1990 | Severinsky et al. | 363/80 |
| 5,402,060 A * | 3/1995 | Erisman | 323/268 |
| 5,422,562 A * | 6/1995 | Mammano et al. | 323/282 |
| 5,831,418 A * | 11/1998 | Kitagawa | 323/222 |
| 5,889,392 A | 3/1999 | Moore et al. | |
| 5,963,439 A | 10/1999 | Wuidart et al. | |
| 5,994,885 A * | 11/1999 | Wilcox et al. | 323/285 |
| 6,037,755 A * | 3/2000 | Mao et al. | 323/222 |
| 6,051,963 A * | 4/2000 | Eagar | 323/282 |
| 6,181,120 B1 * | 1/2001 | Hawkes et al. | 323/282 |
| 6,188,209 B1 * | 2/2001 | Poon et al. | 323/255 |
| 6,191,564 B1 * | 2/2001 | Mao | 323/222 |
| 6,225,859 B1 * | 5/2001 | Irvine et al. | 327/552 |
| 6,271,651 B1 | 8/2001 | Stratakos et al. | |
| 6,285,175 B1 * | 9/2001 | Massie | 323/290 |
| 6,426,612 B1 * | 7/2002 | Rozsypal | 323/282 |

(Continued)

FOREIGN PATENT DOCUMENTS

WO    WO 01/59917 A1    8/2001

*Primary Examiner*—Adolf Berhane
*Assistant Examiner*—Emily Pham

(57) ABSTRACT

A power converter comprising an inductor for receiving energy from a power supply, and connected to the inductor an output capacitor for providing an output voltage. In order to ensure a quick compensation of a reduction of load at the voltage output using few output capacitors, an additional current path is arranged in parallel either to the inductor or to the capacitor, which additional current path can be opened and closed. A current flowing through the additional current path reaches basically immediately a desired value, when the additional current path is opened. Feedback means are moreover provided for opening the additional current path, when the output voltage reaches a predetermined maximum value.

25 Claims, 4 Drawing Sheets

U.S. PATENT DOCUMENTS

| | | | |
|---|---|---|---|
| 6,522,108 B2 * | 2/2003 | Prager et al. | 323/222 |
| 6,661,212 B2 * | 12/2003 | Ostrom | 323/276 |
| 6,696,825 B2 * | 2/2004 | Harris et al. | 323/282 |
| 6,980,449 B2 * | 12/2005 | Chang | 363/84 |
| 7,157,809 B2 * | 1/2007 | Gavrila et al. | 307/52 |
| 2002/0036486 A1 * | 3/2002 | Zhou et al. | 323/272 |
| 2002/0057082 A1 * | 5/2002 | Hwang | 323/284 |

* cited by examiner

POWER CONVERTER

The invention relates to a power converter comprising an inductor for receiving energy from a power supply, and connected to the inductor an output capacitor for providing an output voltage. The invention relates equally to a method for operating such a power converter.

Power converters of this kind are known from the state of the art. They comprise, for example, conventional buck converters, which are used for DC (direct current) to DC down-conversions.

A buck converter comprises a series connection of an inductor and an output capacitor as output filter, and switching means connecting the series connection with a DC voltage source. The switching means are controlled such that a desired output voltage is obtained across the output capacitor. The output capacitor thus provides a regulated voltage output for a load.

A common problem occurring with buck converters are voltage ripples at the output, which are usually reduced by increasing the number of output capacitors. The required large number of output capacitors, however, makes the output filter to one of the most expensive parts of the power supply.

While buck converters can be used as single converters, alternatively a plurality of buck converters may be used in a so called multiphase converter. The principle of multiphase converters allows reduction of the output voltage ripple under steady state conditions. Thus the number of output capacitors might be reduced by using a multiphase converter.

Still, the voltage ripple at the output of a buck converter is determined mainly by the voltage drops and jumps associated with load transients. The reason for an increase of the output voltage whenever the load current is reduced is the energy stored in the buck inductor. This energy is delivered to the output capacitors, also in the case of multiphase converters. Therefore, the load steps reducing the load current as defined by a specific application determine the amount and type of output capacitors which are needed to stay within an allowed voltage tolerance.

Buck converters are used in particular for DC-DC down-conversions for high speed digital ICs (integrated circuits), like high end Pentium® processors for PCs (personal computers). Especially high speed digital ICs exhibit very steep load transients. At the same time, the specification of these ICs request very severe voltage tolerance limits. The supply voltage of high speed digital ICs clearly tends to lower voltages reaching less than 1.5V in the near future. Thus, a voltage control is of particular importance for such high speed applications.

Also other kinds of conventional converters require a high number of expensive capacitors in order to keep the output voltage within acceptable bounds.

In patent application WO 01/59917, it has been proposed to use an inductance, which is composed of a first inductor and a second inductor connected in parallel to each other. The branch comprising the second inductor comprises in addition a switch, which is only closed during load transients. This solution enables a reduction of voltage ripples, but due to the characteristics of an inductor, the reaction time is rather slow, since the current through the branch is only build up slowly.

It is an object of the invention to provide a power converter with a reduced number of capacitors, which compensates quickly for a reduction of load at the voltage output of the converter.

A power converter is proposed, which comprises an inductor for receiving energy from a power supply, and connected to the inductor an output capacitor for providing an output voltage. Further, the proposed power converter comprises an additional current path arranged in parallel either to the inductor or to the capacitor. The additional current path can be opened and closed. The additional current path is formed such that a current flowing through it reaches basically immediately a desired value when the additional current path is opened. Feedback means are moreover provided for opening the additional current path, when the output voltage across the output capacitor reaches a predetermined maximum value. The feedback means may, but do not have to, comprise processing means for controlling the additional current path.

Moreover, a corresponding method is proposed.

The invention proceeds from the consideration that the number of output capacitors can be decreased by removing energy stored in the inductor during the load reduction. The stored energy is removed according to the invention by using an additional current path, or transient shunt. The proposed transient shunt allows minimizing the number of output capacitors in the converter, since the influence of load steps due to a reduction of the load is canceled.

It is thus an advantage of the invention that it enables a reduction of the capacitance down to the limit determined either by the turn-on transients or by the normal operation.

In contrast to the solution according to document WO 01/59917, the proposed power converter is moreover able to react immediately to a detected reduction of the connected load. Since a defined additional current path is provided, instead of an additional inductor, the compensation is not subject to a delay due to the gradual increase of the current through the additional inductor, as in document WO 01/59917.

Preferred embodiments of the invention become apparent from the dependent claims.

The additional current path may comprise any components which provide a controlled impedance and thus a defined current path, i.e. a path on which the current is set immediately. The additional current path may be in particular a low impedance path or comprise a current source.

In one embodiment, the additional current path can only be opened and closed, e.g. opened for a predetermined time or opened until a predetermined voltage over the output capacitor is reached. In the latter case, a hysteresis is achieved.

In another embodiment, the additional current path can be regulated in addition when open, for instance based on the current through the inductor or based on the voltage across the capacitor.

The invention can be employed for compensating for any reduction of load, i.e. as well for a partial reduction as for a complete turn-off of the load.

The invention can moreover be employed for various kinds of power converters. The invention can be employed for instance for buck converters, but equally for other down-converters, for boost converters as well as for other kinds of up-converters, and also for combined boost/buck converters and other kinds of combined up/down converters.

The invention can further be employed as well for single converters as for multiphase converters.

The invention can be employed in particular for point-of-load DC-DC converters for all high-speed ICs, currently especially for Pentium®-like processor cores and for DSPs (digital signal processors).

The invention will now be described in more detail by way of example and with reference to the attached drawings, wherein:

FIG. 1 is a basic circuit diagram of a buck converter with an indication of possible locations for an additional current path according to the invention.

Figure 1:
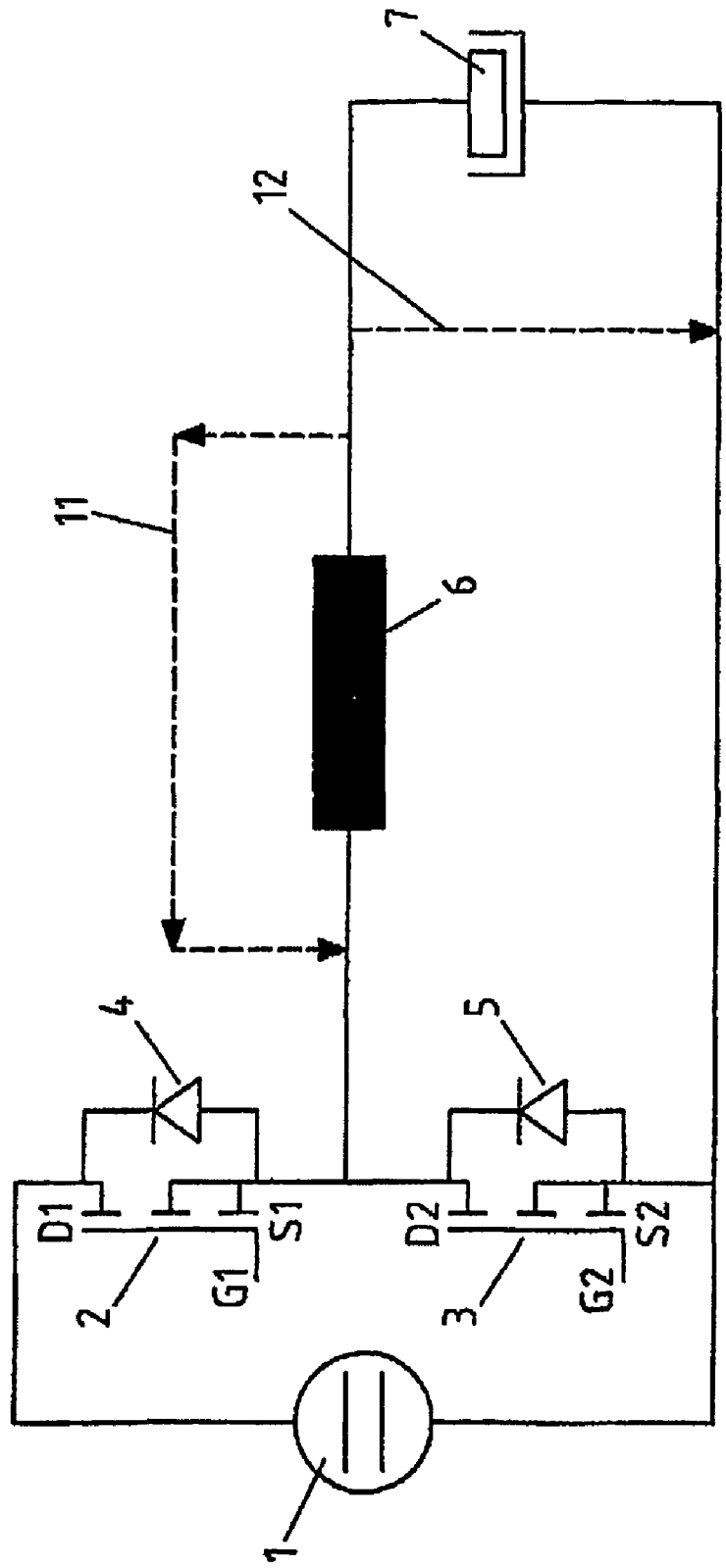
FIG. 1 is a circuit diagram of a buck converter with an indication of two different possible locations for an additional current path according to the invention.

The buck converter comprises a voltage source 1. A first terminal of the voltage source 1 is connected to the drain D1 of a first MOSFET (metal-oxide semiconductor field-effect transistor) 2, while the second terminal of the voltage source 1 is connected to ground. The source S1 of the first MOSFET 2 is further connected to the drain D2 of a second MOSFET 3. The source S2 of the second MOSFET 3 is connected to ground. A respective diode 4, 5 is connected in parallel to each of the two MOSFETs 2, 3. The respective gate G1, G2 of the MOSFETs 2, 3 is connected to a control unit (not shown), which is responsible for switching the MOSFETs 2, 3.

In addition, a first connection of an inductor 6 is connected between the source S1 of the first MOSFET 2 and the drain D2 of the second MOSFET 3. The second connection of the inductor 6 is connected to a first connection of an output capacitor 7. The second connection of the output capacitor 7 is connected to ground.

The voltage across the output capacitor 7 can be provided as regulated voltage supply to a load. The output voltage is regulated by adjusting the switching of the MOSFETs 2, 3 by means of the control unit.

According to the invention, an additional current path 11 or 12 is provided in parallel to the inductor 6 and/or in parallel to the capacitor 7. The additional current path 11 or 12 is opened, whenever a load connected to the output capacitor 7 is turned off. Thereby, the energy stored in the inductor 6 can be removed via the additional current path. The direction of the current on the possible additional current paths is indicated by arrows.

Figure 2:
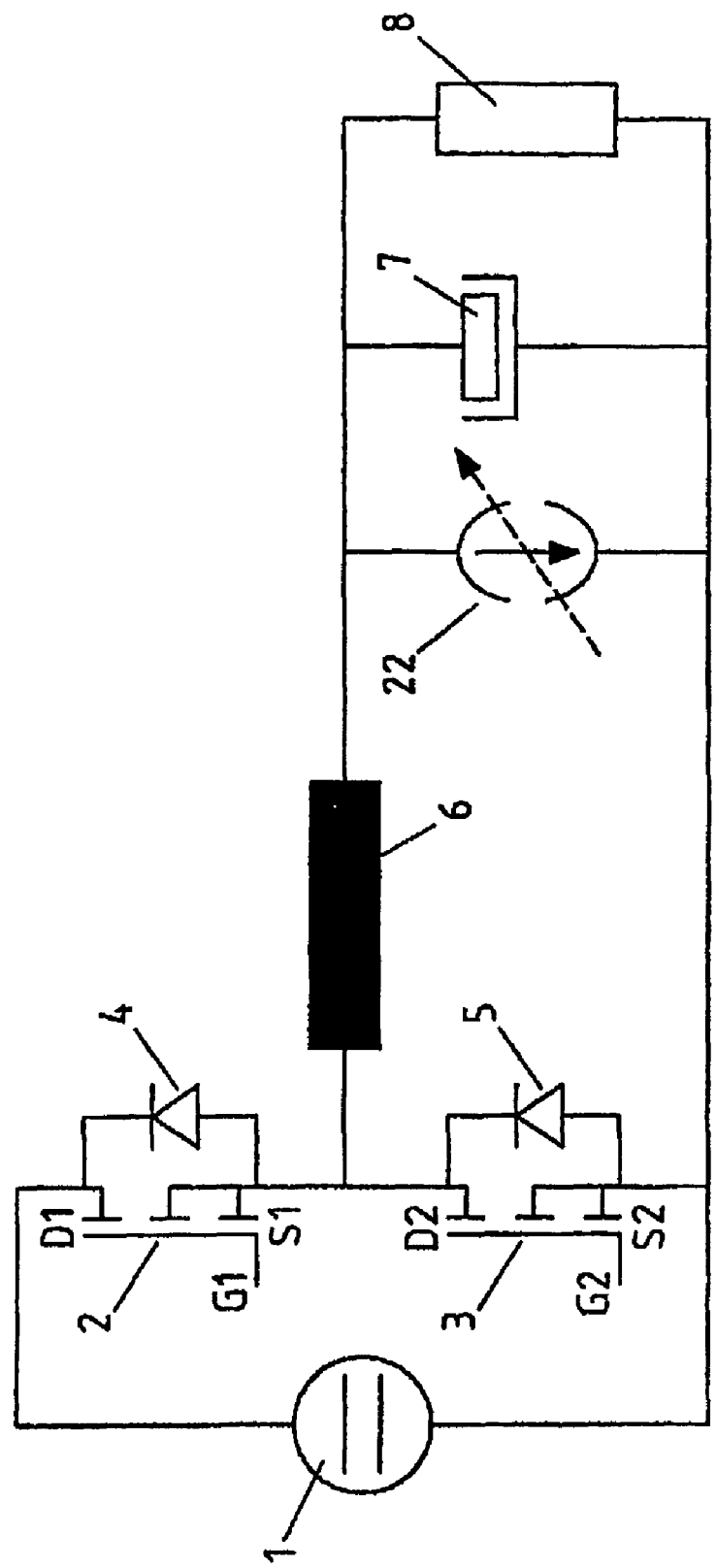
FIG. 2 is a circuit diagram of a first embodiment of a buck converter according to the invention using a current source in an additional current path.

FIG. 2 presents a first embodiment of a buck converter according to the invention including an additional current path. The buck converter corresponds to the buck converter described with reference to FIG. 1, and the same reference signs were used for corresponding components. Here, a load 8 connected to the output capacitor 7 is depicted as well. For providing the additional current path 12 of FIG. 1, a controlled current source 22 is connected in parallel to the output capacitor 7. The current source 22 is arranged such that it is able to provide an additional current in the direction of ground. A control input of the current source 22 is connected to feedback means. The feedback means constitute a connection to the voltage output of the buck converter and may include the control unit.

As long as the load 8 is turned on, the current path comprising the controlled current source 22 is not opened, and the buck converter operates like a conventional buck converter. As soon as the load 8 is turned off, however, the controlled current source 22 is activated, in order to reduce the energy in the inductor 6. Turning off of the load 8 leads to an increase in the voltage over the output capacitor 7. The feedback means therefore open the additional current path by activating the current source 22, whenever the output voltage reaches a predetermined, application dependent maximum limit.

Once the current source 22 is activated, it is regulated by the output voltage such that the output voltage is maintained at a predefined limit, which is the same as regulating the current into the capacitor 7 to zero. Alternatively, the current source 22 could be regulated to follow the inductor 6 current, in order to regulate the current into the combination of capacitor 7 and load 8 to zero. In another alternative, a fixed amount of current could be subtracted by the current source 22. This fixed amount has to be equal to or larger than the worst case maximum inductor current remaining when the predetermined limit for the output voltage is reached. The current could be drawn either for a certain time, which means that a certain amount of energy is not only drawn from the inductor 6 but also from the output capacitor 7. Further, the current could be drawn until the output voltage has dropped below a certain value. Thereby, a hysteretic control of the current is achieved.

Figure 3:
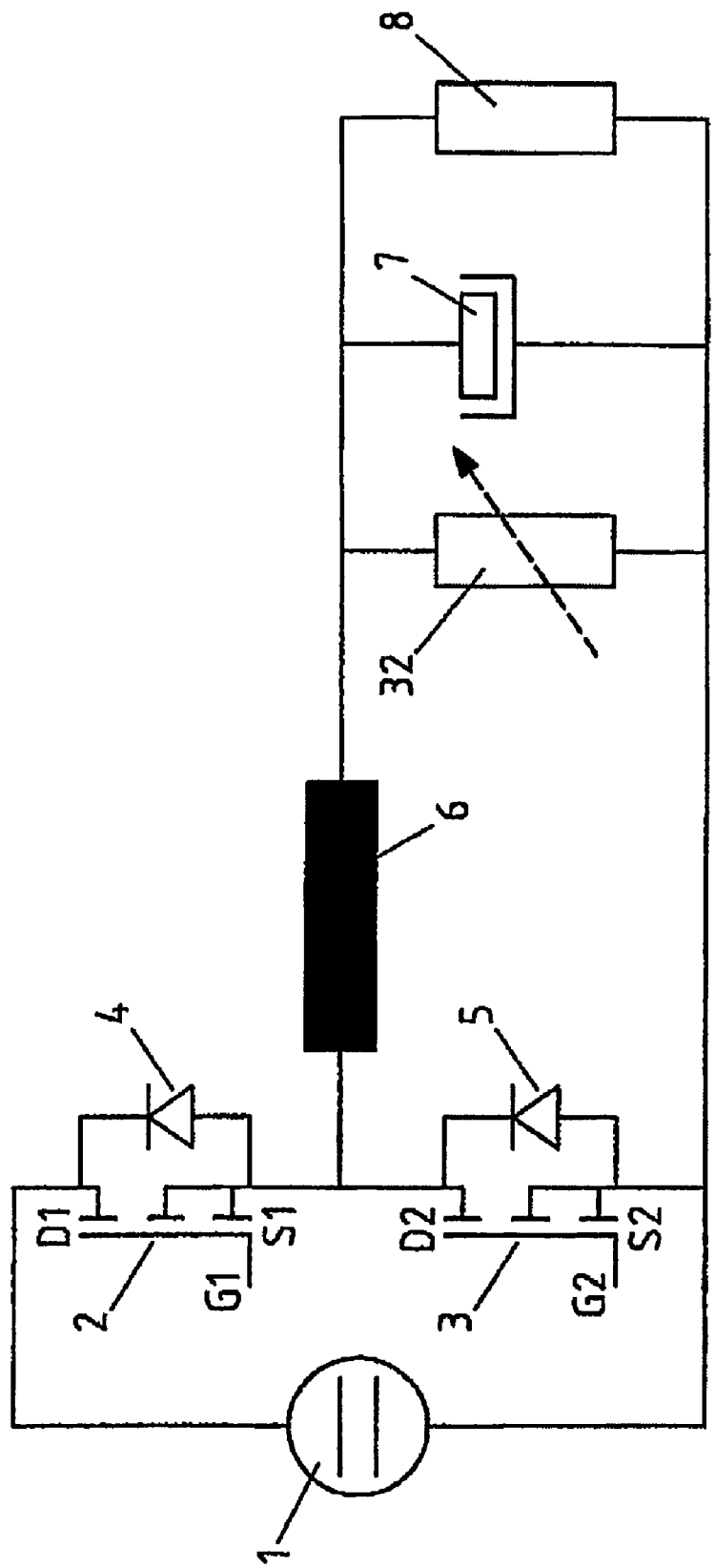
FIG. 3 is a circuit diagram of a second embodiment of a buck converter according to the invention using a low impedance path as additional current path.

FIG. 3 presents a second embodiment of a buck converter according to the invention including an additional current path. The buck converter corresponds again to the buck converter described with reference to FIG. 1, and the same reference signs were used for corresponding components. A load 8 is connected again to the output capacitor 7. For providing the additional current path 12 of FIG. 1, a variable resistor 32 is connected in parallel to the output capacitor 7. Thereby, a low impedance path is achieved as additional current path. Like in the embodiment of FIG. 2, the additional current path is opened, when the voltage over the output capacitor 7 reaches a predetermined value. The variable resistor 32 can be controlled in several ways, just as described for the current source 22 of FIG. 2. A control input of the resistor 32 is connected to feedback means, which open the current path by reducing the resistance of the resistor 32. The feedback means constitute again a connection to the voltage output of the buck converter and may include the control unit.

For a hysteretic control of the output voltage, the resistor 32 can be realized for instance with a MOSFET having a certain on-resistance. This MOSFET is turned on when a predetermined voltage limit over the output capacitor 7 is reached. This voltage limit is set such that it is reached when the load 8 is turned off. As a result, the complete inductor current is shunted through this on-resistance. The on-resistance has to be low enough to shunt the current under all circumstances. Thus, normally, also a current will flow out of the output capacitor 7 through the MOSFET. When the voltage drops below a certain second predetermined threshold value, the MOSFET is turned off again. The remaining current in the inductor will then start to charge the output capacitor 7 again, leading eventually to additional shunting actions.

Figure 4:
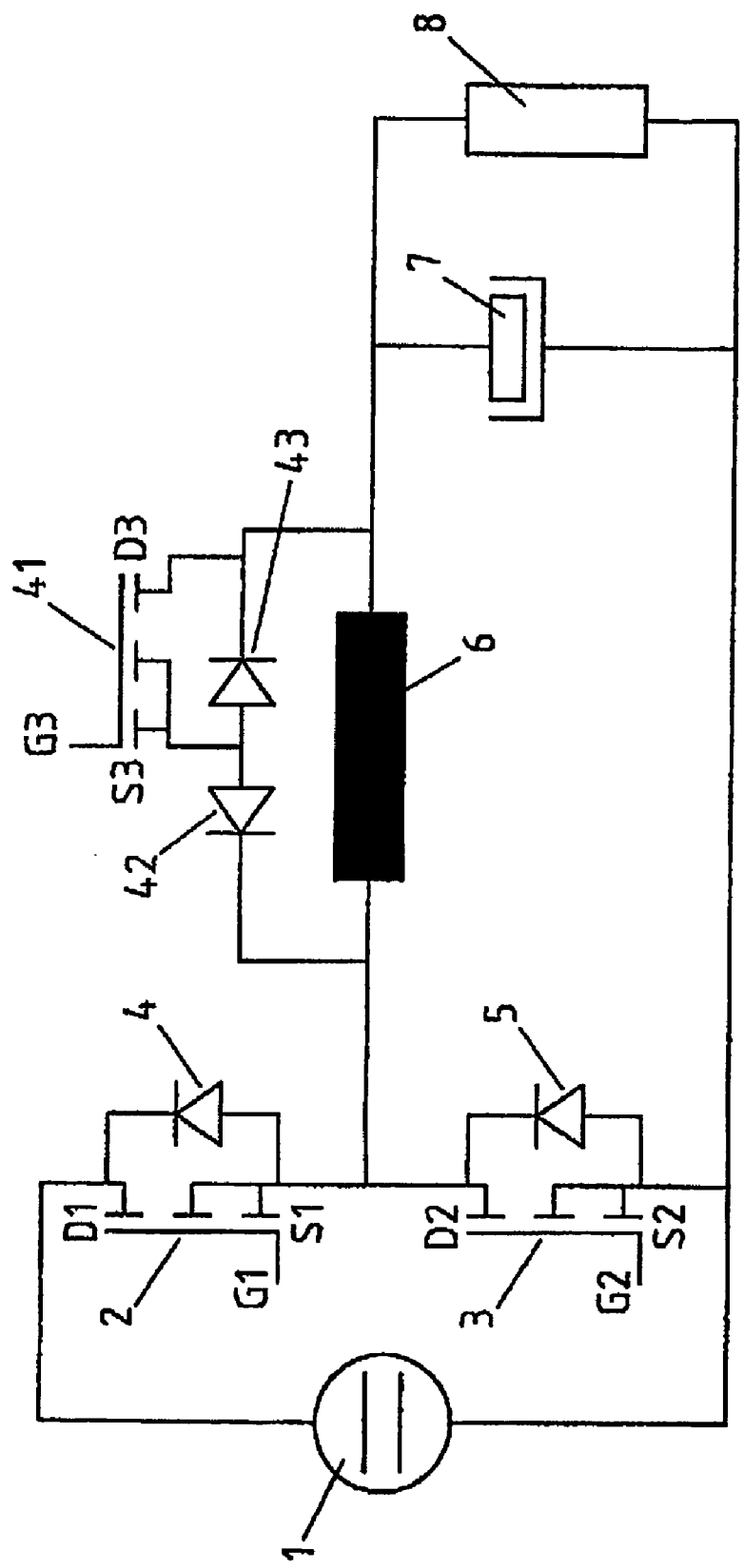
FIG. 4 is a circuit diagram of a third embodiment of a buck converter according to the invention using a low impedance path as additional current path.

FIG. 4 presents a third embodiment of a buck converter according to the invention including an additional current path. The buck converter corresponds again to the buck converter described with reference to FIG. 1, and the same reference signs were used for corresponding components. A load 8 is connected again to the output capacitor 7. For providing the additional current path 11 of FIG. 1, a variable impedance is connected in parallel to the inductor 6. Thus, again a low impedance path is achieved as additional current path.

The variable impedance is realized with a MOSFET 41 and two diodes 42, 43, diode 43 being the body diode of MOSFET 41. A series connection of the two diodes 42, 43 is connected in parallel to the inductor 6. The forward direction of the two diodes 42, 43 is opposite to each other. MOSFET 41 is connected in parallel to the diode 43 having its forward direction in direction of the output capacitor 7. More specifically, the drain D3 of MOSFET 41 is connected to the connection of the diode 43 which is closer to the output capacitor 7, while the source S3 of MOSFET 41 is connected to the connection of the diode 43 which is farther away from the output capacitor 7. The gate G3 of MOSFET 41 is connected to feedback means. The feedback means constitute a connection to the voltage output of the buck converter and may include the control unit.

When the output voltage reaches a predetermined value, a voltage is applied by the feedback means to the gate G3 of MOSFET 41. Thereby, the inductor 6 is short-circuited in one direction with a specific resistance via MOSFET 41 and diode 42. The inductor current thus starts to circulate. The energy in the choke will decrease due to losses in the MOSFET 41 and the diode 42. If the current drops to zero, the entire energy is dissipated in the MOSFET 41 and the diode 42.

In case the load 8 is turned on again and thus requires energy again, while the current is still circulating, the remaining energy can be used to start supplying the load 8. To this end, diode 42 may be realized as Schottky diode or by a further low ohmic MOSFET. Thus, the decay in the inductor current can be decreased and more current will remain in the inductor to be supplied to the load 8 again. A further MOSFET is turned on in case the load 8 is turned on again, while MOSFET 41 is still on, resulting in an additional short-circuit in the opposite direction. Additionally, such a further MOSFET could be turned on in case the load 8 is rapidly turned on again.

It is to be noted that the described embodiments of the invention constitute only some of a variety of possible embodiments. It is further understood that any of the presented embodiments of the invention can be varied and supplemented in many ways.

The invention claimed is:

1. Power converter for providing power to an input terminal of a load, the power converter comprising:
   a current path that includes an inductor having an input for receiving energy from a power supply and a capacitor circuit for outputting power to the input terminal of the load;
   an additional current path, beginning at an output of the inductor and including a circuit element configured to control the additional current path, said additional current path formed to have current flowing through said additional current path basically immediately reach a desired value, when said additional current path is enabled by the circuit element;
   a first switch coupled between the power supply and the inductor, the first switch configured to provide the energy from the power supply to the inductor; and
   a feedback circuit configured to control and enable the additional current path, in response to a level of a voltage used for outputting the power reaching a first threshold, to draw current from the input terminal of the load.

2. Power converter according to claim 1, wherein the output capacitor circuit includes a capacitor for accumulating energy and providing a node for the voltage used for outputting the power.

3. Power converter according to claim 1, wherein said additional current path is a low impedance path when enabled.

4. Power converter according to claim 3, wherein said low impedance path comprises a resistor.

5. Power converter according to claim 1, wherein said feedback circuit is configured to enable the additional current path for a predetermined time.

6. Power converter according to claim 1, wherein said feedback circuit is configured to control the circuit element to disable the additional current path in response to the level of the voltage reaching a second threshold.

7. Power converter according to claim 1, wherein said feedback circuit is configured to control the circuit element to enable and disable the additional current path based on the level of the voltage.

8. Power converter according to claim 1, wherein said feedback circuit is further configured to control the current through the additional current path based on a current through said inductor while the additional current path is enabled.

9. Power converter according to claim 1, wherein said power converter is one out of a group of a buck converter, a boost converter and a buck/boost converter.

10. Method for controlling a power converter, the power converter including a current path having an inductor with an input for receiving energy from a power supply and a capacitor circuit for outputting power to an input terminal of a load, said method comprising:
    providing the energy from the power supply to the inductor via a switch; and
    in response to a level of a voltage used for outputting the power reaching a first threshold, enabling a controllable additional current path arranged to begin at an output of the inductor and in parallel to said output capacitor the additional current path configured to reach a respective desired current flow basically immediately through said additional current path and draw energy from the input terminal when enabled.

11. The method of claim 10, wherein the additional current path includes a controllable element configured to selectably enable and disable the additional current path.

12. The method of claim 11, further comprising using the controllable element to inhibit the energy provided by the inductor from flowing through the additional current path when the additional current path is disabled.

13. The method of claim 10, further comprising opening the additional current path for a predetermined amount of time.

14. The method of claim 10, further comprising disabling the additional current path in response to the level of the voltage reaching a second threshold.

15. The method of claim 10, further comprising adjusting the current through the additional current path to be responsive to a current through the inductor in a time period when the additional current path is enabled.

16. Power converter according to claim 1, wherein the circuit element is a controllable element for enabling and disabling the additional current path.

17. Power converter according to claim 16, further comprising a second switch, a first end of the second switch coupled between the inductor and the first switch and a second end of the second switch coupled to a ground voltage, the second switch configured to pass current to the ground voltage when the second switch is engaged.

18. Power converter according to claim 16, wherein the controllable element inhibits the energy provided by the inductor from flowing through the additional current path when the additional current path is disabled.

19. The method of claim 15, the adjusting the current through the additional current path while in the conductive state to be responsive to a current through the inductor includes configuring the additional current path to pass a current substantially equal to the current passed through the inductor.

20. The power converter according to claim 8, wherein the feedback circuit is configured to control the current through the additional current path based on a current through said inductor while the additional current path is in the conductive state to set the current through the additional current path to be substantially equal to the current through the inductor.

21. The power converter according to claim 1, wherein the first and second values are selected to achieve hysteretic control of the current through the additional path.

22. The power converter according to claim 1, wherein the additional current path draws energy from the inductor and the capacitor circuit while enabled.

23. The power converter according to claim 1, wherein the energy storage circuit is coupled to the output of the inductor.

24. The power converter according to claim 6, wherein said additional current path is a high impedance path when disabled.

25. The power converter according to claim 24, wherein the current path is substantially non-conductive when disabled.

* * * * *